Sax & Kear,
Casting Car Wheels.
No. 3,954. Reissued May 3. 1870.
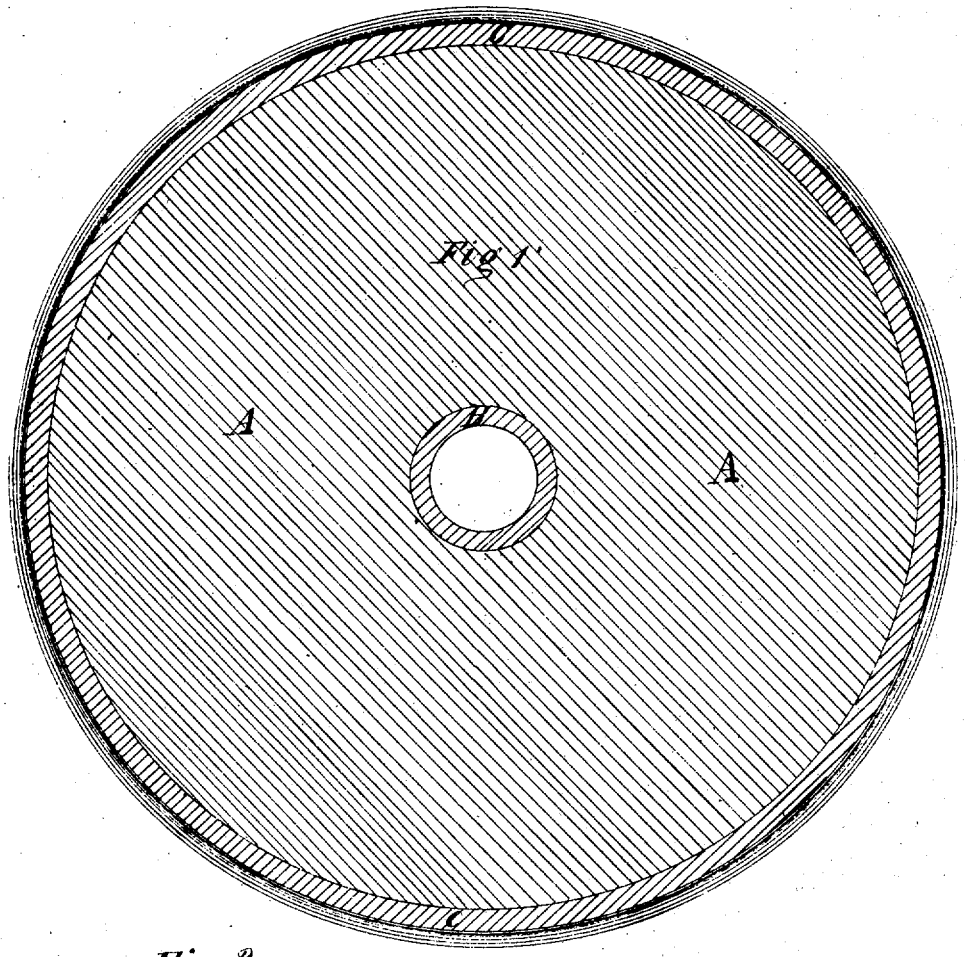
Fig 2
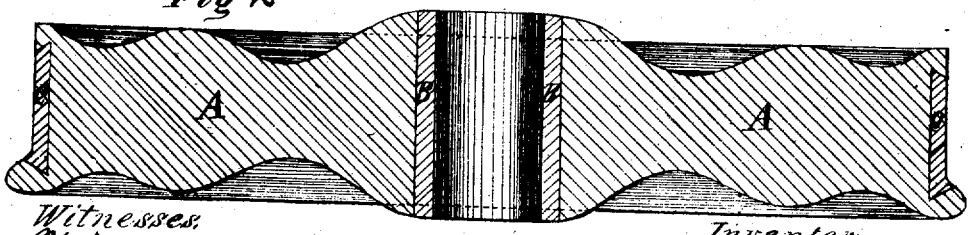
Witnesses:
Wm H. Seaman
A. N. Wygatt
Inventor
John H. Sax & Geo. W. Kear
Daniel Breed Atty

UNITED STATES PATENT OFFICE.

JOHN K. SAX AND GEORGE W. KEAR, OF KINGSTON, PENNSYLVANIA.

IMPROVEMENT IN RAILWAY-CAR WHEELS.

Specification forming part of Letters Patent No. 88,743, dated April 6, 1869; Reissue No. 3,954, dated May 3, 1870.

*To all whom it may concern:*

Be it known that we, JOHN K. SAX and GEORGE W. KEAR, of Kingston, in the county of Luzerne and State of Pennsylvania, have invented certain new and useful Improvements in Wheels for Railroad-Cars and other purposes; and we hereby declare that the following is a full and exact description thereof, reference being had to the accompanying drawings and letters of reference marked thereon.

In the drawings, Figure 1 is a vertical central section of our wheel. Fig. 2 is a transverse section of the same.

Two great difficulties with car-wheels are, injury from wear of the tread and rim of the wheel upon the rail, and the strain of the wheel in forcing it upon the axle by hydraulic pressure.

The object of our invention is to remedy these difficulties, and yet produce a cheap wheel.

Our invention consists, first, of a wheel having a cast-iron body, or being made mostly of cast-iron, and band or tread of hammered or rolled steel welded thereon in the process of casting; second, in a wrought-iron ring, tube, or re-enforce welded into the cast-iron hub of a wheel, in order to bear the strain of forcing the wheel upon the axle.

In order to enable others skilled in the art to make and use our invention, we proceed to describe the same.

Our wheels are made with a body of cast-iron, a tread or circumference of hammered or rolled steel, and the hub is lined with a ring of wrought-iron.

In the manufacture of our wheels we proceed in the following manner: We first make a hammered or rolled steel band of suitable size and form for the circumference or tread and wearing part of the rim of the wheel. We also make a wrought-iron ring, tube, or re-enforce to line the cast-iron hub and receive the axle. Then this band and also the ring are properly placed in the mold intended for casting the body of the wheel. The band and ring are sufficiently heated before being put into the mold, or may be heated with the mold in an oven, and both are fluxed in the usual manner for welding cast-iron to steel or wrought-iron in the process of casting the iron. All being thus prepared, the molten iron is poured in to form the body of the wheel. By this operation the body of the wheel is welded to both the steel band and the wrought-iron ring by a single process well known in welding molten iron to bar iron or steel, yet now first applied by us to making car-wheels.

By this construction of wheel we secure a steel tread to prevent wear from the rail, a cast-iron body for economy, and the toughness of wrought-iron for the hub.

As in the above process of manufacture our entire wheel is heated sufficiently to weld the body to the steel band and the wrought-iron ring, all parts of the wheel cool slowly together, thus preventing any chilling of the metal or strain from shrinking. Therefore there is no need of any annealing process, and our wheels are of a superior quality.

The form of the wheel may be varied for the driving-wheel and for other purposes without departing from our invention.

The steel band may be so made that the molten metal will overlap the edges of the band in the form of a dovetail; but this form is not essential, as the welding is sufficient to hold the parts in place.

We do not broadly claim the process of welding cast-iron to wrought-iron or steel, as this process is old, but limit our claims to the wheel, which we believe to be new.

Having thus described our invention, we claim—

1. A wheel having a cast-iron body welded to a rolled or hammered cast-steel band, tire, re-enforce, or tread, substantially in the manner and for the purposes set forth.

2. A wrought-iron ring, tube, or re-enforce welded in and to a cast-iron hub to receive the axle, substantially in the manner and for the purposes set forth.

In testimony that we claim the foregoing we have hereunto set our hands and seals this 6th day of April, A. D. 1870.

JOHN K. SAX. [L. S.]
GEORGE W. KEAR. [L. S.]

Witnesses:
E. B. HARVEY,
JOHN CODDINGTON.